United States Patent
Basu

(10) Patent No.: US 11,316,734 B2
(45) Date of Patent: Apr. 26, 2022

(54) SYSTEM AND METHOD OF IMPROVING COMPUTER NETWORK SYSTEM

(71) Applicant: Walmart Apollo, LLC, Bentonville, AR (US)

(72) Inventor: Arkadip Basu, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/678,871

(22) Filed: Nov. 8, 2019

(65) Prior Publication Data

US 2020/0153690 A1  May 14, 2020

Related U.S. Application Data

(60) Provisional application No. 62/820,534, filed on Mar. 19, 2019.

(30) Foreign Application Priority Data

Nov. 9, 2018 (IN) .............................. 201811042294

(51) Int. Cl.
*H04L 41/0816* (2022.01)
*H04L 41/142* (2022.01)
(Continued)

(52) U.S. Cl.
CPC ........ *H04L 41/0816* (2013.01); *G06F 3/0485* (2013.01); *G06F 3/04845* (2013.01);
(Continued)

(58) Field of Classification Search
CPC .. G06F 3/0485; G06F 3/04845; G06F 3/1454; H04L 41/06; H04L 51/08;
(Continued)

(56) References Cited

U.S. PATENT DOCUMENTS 5,781,735 A     7/1998  Southard
6,975,963 B2 *  12/2005 Hamilton ............ G06F 11/3466
                                                    702/182

(Continued)

OTHER PUBLICATIONS

"Web Monitoring for Unparalleled User Experience", Website Monitoring Service and Web Performance Monitoring Tools—AlertSite, SmartBear, URL: https://smartbear.com/product/alertsite/web-monitoring/, Retrieved Sep. 21, 2018, 6 pages.

(Continued)

*Primary Examiner* — Umar Cheema Eema
*Assistant Examiner* — John Fan
(74) *Attorney, Agent, or Firm* — Duane Morris LLP; Manita Rawat

(57) ABSTRACT

A method of improving computer network, includes receiving an identification of performance metrics of the computer network; automatically capturing screenshots of the monitoring dashboards of the performance metrics based on the identification; storing automatically the captured screenshots in an image file format on a storage facility; transmitting automatically and selectively, via a messaging channel, the captured screenshots to designated recipients; analyzing the received screenshots to assess the desired performance metrics, the analyzing including identifying undesirable performance metrics; and providing actions based on the analysis to change configurations of the computer network to address the identified undesirable performance metrics.

18 Claims, 4 Drawing Sheets

(51) Int. Cl.
*H04L 41/22* (2022.01)
*H04L 51/08* (2022.01)
*H04L 41/28* (2022.01)
*H04L 41/06* (2022.01)
*H04L 9/40* (2022.01)
*G06F 3/14* (2006.01)
*G06F 3/0485* (2022.01)
*G06F 3/04845* (2022.01)
*H04L 67/02* (2022.01)
*H04L 69/04* (2022.01)
*H04L 29/06* (2006.01)

(52) U.S. Cl.
CPC ............ *G06F 3/1454* (2013.01); *H04L 41/06* (2013.01); *H04L 41/142* (2013.01); *H04L 41/22* (2013.01); *H04L 41/28* (2013.01); *H04L 51/08* (2013.01); *H04L 63/083* (2013.01); *H04L 63/10* (2013.01); *H04L 67/02* (2013.01); *H04L 69/04* (2013.01)

(58) Field of Classification Search
CPC ..... H04L 63/10; H04L 63/083; H04L 41/142; H04L 41/22; H04L 67/02; H04L 41/28; H04L 41/0816; H04L 69/04
USPC ........................................................ 709/224
See application file for complete search history.

(56) References Cited

U.S. PATENT DOCUMENTS

| | | | | |
|---|---|---|---|---|
| 7,685,273 | B1* | 3/2010 | Anastas | H04L 12/6418 709/224 |
| 8,209,218 | B1* | 6/2012 | Basu | G06Q 10/0637 705/7.39 |
| 9,608,880 | B1* | 3/2017 | Goodall | H04L 43/045 |
| 10,423,657 | B2* | 9/2019 | Pearlman | G06F 16/5866 |
| 10,469,344 | B2* | 11/2019 | Fletcher | H04L 12/44 |
| 2003/0145080 | A1 | 7/2003 | Breese et al. | |
| 2006/0023638 | A1 | 2/2006 | Monaco et al. | |
| 2006/0242282 | A1 | 10/2006 | Mullarkey | |
| 2014/0143415 | A1* | 5/2014 | Kazerani | H04L 45/123 709/224 |
| 2016/0321832 | A1* | 11/2016 | Blohme | G06T 13/80 |

OTHER PUBLICATIONS

"Create Web Monitors With DejaClick", AlertSite Features—SmartBear Software, URL: https://smartbear.com/product/alertsite/alertsite-features/dejaclick/, Retrieved Sep. 21, 2018, 3 pages.
"Capture Network Traffic with Automation Scripts", Capture Network Traffic with Automation Scripts—Sauce Labs, URL: https://saucelabs.com/blog/capture-network-traffic-with-automation-scripts, Retrieved Sep. 21, 2018, 9 pages.
"Introduction to QA in Matomo", Our latest improvement to QA: Screenshot Testing—Analytics Platform—Matomo, URL: https://saucelabs.com/blog/capture-network-traffic-with-automation-scripts, Retrieved Sep. 21, 2018, 9 pages.
"7 marketing reports you'll never have to pull again", 7 marketing reports you'll never have to pull again—The Official Slack Blog, URL: https://slackhq.com/7-marketing-reports-youll-never-have-to-pull-again, Retrieved Sep. 21, 2018, 15 pages.

* cited by examiner

SYSTEM AND METHOD OF IMPROVING COMPUTER NETWORK SYSTEM

CROSS-REFERENCE TO RELATED APPLICATIONS

This patent application claims the priority to Indian Provisional Application No. 201811042294, filed Nov. 9, 2018, and U.S. Provisional Application No. 62/820,534, filed, Mar. 19, 2019, contents of which are incorporated by reference herein.

BACKGROUND

1. Technical Field

The present disclosure relates to e-commerce computer network systems, and more specifically to a system and method of monitoring and detecting errors and degraded performance in a computer network system.

2. Introduction

An e-commerce platform provides a platform on which customers can navigate marketplaces, search for desirable products, order products, etc. Such an e-commerce platform may comprise a complex computer network system including software and hardware that cooperatively works together. During peak use periods, the computer network system may slow down or crash. To ensure the computer network system performs properly, performance of the software and hardware should be monitored in order to avoid, for example, any network congestion and downtime. However, existing monitoring and detection approaches may be inefficient and cost-ineffective for improving the computer network system. Therefore, there is a need for systems and methods of improving computer network systems, which can identify errors and issue notifications regarding system performance. Such systems and methods of improving computer network systems and their operation are provided herein in this disclosure.

SUMMARY

A method for performing concepts disclosed herein can include receiving an identification of performance metrics of the computer network, the identification including one or more of specifying desired performance metrics, specifying a time range for the desired performance metrics during which the desired performance metrics is monitored, and specifying desired features of the desired performance metrics; automatically capturing screenshots of the monitoring dashboards of the desired performance metrics based on the identification; storing automatically the captured screenshots in an image file format on a storage facility; transmitting automatically and selectively, via a messaging channel, the captured screenshots to designated recipients; analyzing the received screenshots to assess the desired performance metrics, the analyzing including identifying undesirable performance metrics; and providing actions based on the analysis to change configurations of the computer network to address the identified undesirable performance metrics.

A system for performing concepts disclosed herein can include a processor, and a computer-readable storage medium having instructions stored which, when executed by the processor, cause the processor to perform operations comprising: receiving an identification of performance metrics of the computer network, the identification including one or more of specifying desired performance metrics, specifying a time range for the desired performance metrics during which the desired performance metrics is monitored, and specifying desired features of the desired performance metrics; automatically capturing screenshots of the monitoring dashboards of the desired performance metrics based on the identification; storing automatically the captured screenshots in an image file format on a storage facility; transmitting automatically and selectively, via a messaging channel, the captured screenshots to designated recipients; analyzing the received screenshots to assess the desired performance metrics, the analyzing including identifying undesirable performance metrics; and providing actions based on the analysis to change configurations of the computer network to address the identified undesirable performance metrics.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DETAILED DESCRIPTION

Figure 1:
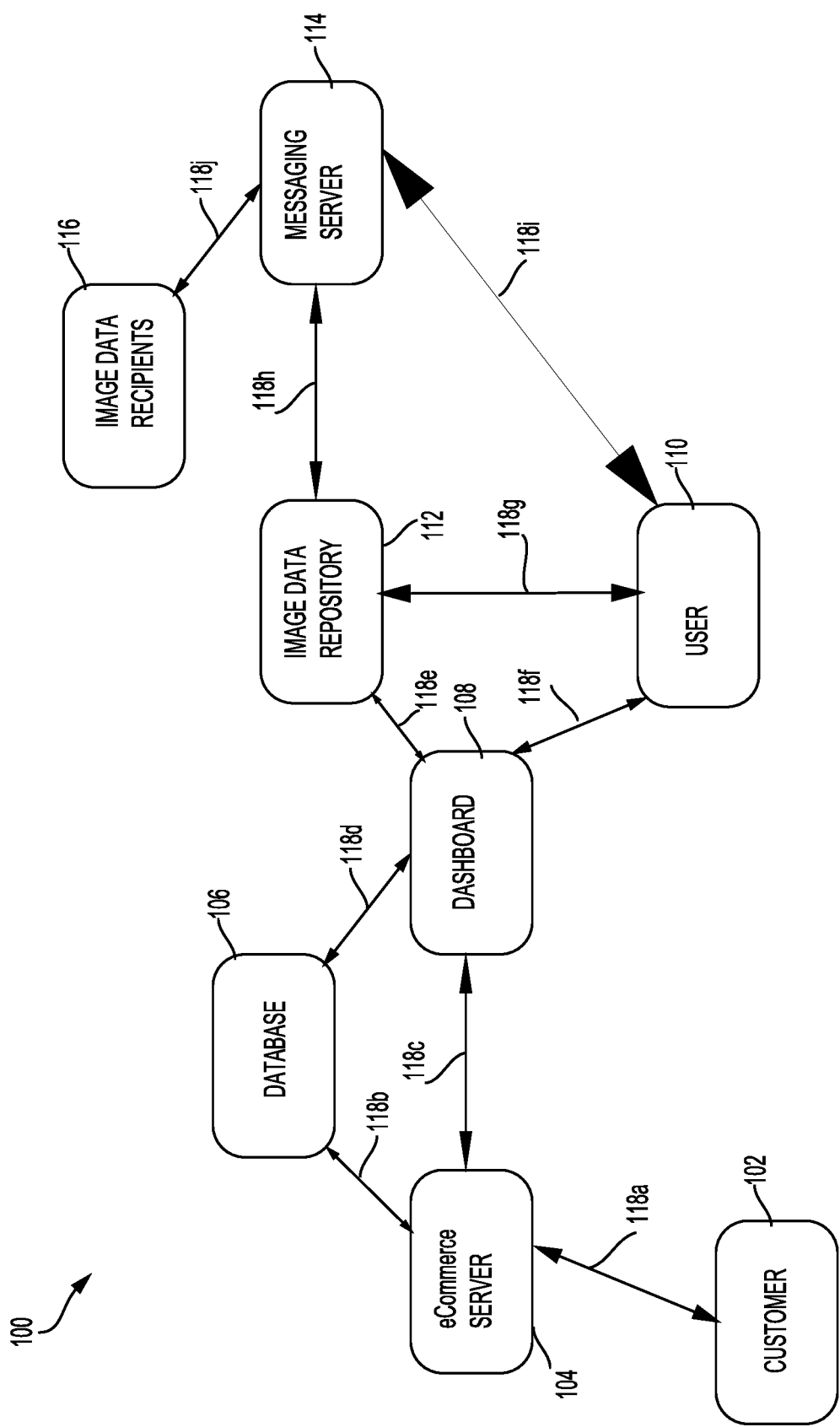
FIG. 1 illustrates an exemplary system of improving computer network in accordance with one embodiment.

Systems, methods, and computer-readable storage media configured according to this disclosure are provided for improving computer network system. Various specific embodiments of the disclosure are described in detail below. While specific implementations are described, it should be understood that this is done for illustration purposes only. Other components and configurations may be used without parting from the spirit and scope of the disclosure, and can be implemented in combinations of the variations provided. These variations shall be described herein as the various embodiments are set forth. For example, as will be described in the below, an improved computer network system is described in context of e-commerce, but may also be applied to other situations such as data center management.

The performance of an e-commerce computer architecture (e.g., computer network system) may be monitored from various dashboards. The dashboards may be configured to track various performance metrics of the computer network system. The various metrics may include, but not be limited to, customer journey, infrastructure performance and all related details. The dashboards may be provided over various platforms such as Grafana, Stat Seeker, or Medusa.

For example, prior to holiday shopping season, a stress test may be periodically conducted on the infrastructure of the computer network system. This may be done to check the load handling capacity of specific services. To avoid failovers during peak hours, devices of the computer network system may be monitored and examined to capture relevant logs for analysis and continual improvement of the devices. The monitoring may be performed on a dashboard on which, for example, webpage load speed, customer transactions, and central processing unit (CPU) usage may be displayed and monitored. The monitoring results may be further analyzed for, for example, anomaly detection and error correction.

Embodiments of the invention may be used to quickly detect network or device performance slowdowns or failures. Dashboard information may be automatically captured when selected network parameters cross a threshold. System errors may be detected and corrected, improving the efficiency and operation of the computer network systems.

The system and method disclosed herein may automatically log in to an internal monitoring dashboard portal of the computer network system. The system may be configured to navigate to specified uniform resource locator(s) (URL(s)) related to team specific application and hardware dashboards. A script may execute to auto scroll and adjust page zoom on the dashboards to capture appropriate screenshots. The system may be configured to save the captured screenshots in a repository with a selected naming convention. The naming convention may be, for example, in a format: Page-Name_Date-Time_Sequence. Additionally, other data may be saved with screenshots, including date and time, etc. in a ZIP file to store all the images (the files including the screenshots) in one repository.

Detail logs associated with the files may be automatically stored for further detailed analysis. The detail logs may include name of a user whose credential is used to automatically log into the dashboard portal, date and time of the logging, date and time of capture of each screenshot, designated recipients of those screenshots, etc.

In some embodiments, the system may issue notifications and alerts. For example, the system and method disclosed herein may comprise a messaging platform. This may be done by integrating with a messaging platform, such as Slack (a messaging platform across an organization.) The system and method may upload all the relevant captured images to a designated slack channel. A user of the system and method may have the flexibility to identify all the captured images or, the selected images on which a user input phrase is matched. For example, the user may prefer to only transmit the captured screenshot images related to a specific team. In such a case, the user input phrase may be name of the specific team. Also, the user may prefer to only transmit the captured screenshot images related to a CPU. In such a case, the user input phrase may be CPU. Once triggered, the whole process may run without any manual intervention. In such a way, the captured images may be posted directly and automatically.

In some embodiments, the system and method disclosed herein may comprise custom applications to perform desired actions. For example, simple mail transfer protocol (SMTP) configuration may be integrated into the disclosed system, to trigger e-mail being sent automatically to the designated recipients. In such a way, the captured details including images may be automatically mailed to the designated recipients. The e-mail may contain custom messages and the image files may be placed in an attachment. The whole process may be automated.

In some embodiments, the disclosed system and method may include triggering alerts. In each dashboard, a threshold limit for a parameter may be set. Once the parameter crosses the threshold limit, a notification may be issued. For example when utilization value of CPU of a service or an application crosses a threshold, a notification may be issued.

In some embodiments, the disclosed system and method may perform on-demand data capture from the dashboards. For example, based on external triggers, pre-configured tasks may be run. For example, a specific day and time of a week may be set to trigger a pre-configured task. The pre-configured task may include automatically capturing screenshots of dashboards regarding a specific performance metric at the specified day and time, automatically saving the captured screenshots, automatically sending the captured screenshots to designated recipients, etc.

The disclosure now turns to FIG. 1. FIG. 1 shows an exemplary system 100 in accordance with one embodiment. The system 100 may comprise one or more customer devices 102, one or more e-commerce servers 104, database device 106 that may hold backend data of the server 104, and one or more dashboard 108s on which performance of the e-commerce server 104 and the database 106 may be monitored.

The system 100 may further comprise one or more user devices 110 to access the dashboard 108, image data repository device 112, messaging server 114 and image data recipient device 116. The above devices and servers may communicate one another via communications networks 118, for example, 118a to 118j.

The device 102 may be any computing device, such as a mobile phone, a computing tablet, or a laptop computer, which may be used by the customer to access the e-commerce website server 104.

The server 104 may be any computing devices, such as desktop computers, laptop computers, dedicated computer servers, mainframes, etc. Various operating systems and applications, such as Linux, Windows operating system, database, may be installed on the server 104. The server 104 may hold e-commerce website and other applications that may be accessed by customer device 102. For example, the server 104 may check customer account login information. The customer device 102 may create customer accounts that may be stored on the server 104. The server 104 may track customers activities on the e-commerce website, such as order status, checking out status, how often the customer visit the website, what favorite products the customer searches for, etc.

The database device 106 may be any computing device, such as desktop computers, laptop computers, dedicated computer servers, mainframes, etc. Various operating systems and data management applications may be installed on the database 106. The database device 106 may hold any backend data associated with the e-commerce server 104. For example, the backend data may include, but not limited to, product inventory, product vendors information, customer account login information, customer profile, customer credit card and other financial information, customer order status, customers activities on the e-commerce website, etc.

Dashboard 108 may be used to monitor performance of the e-commerce server 104, the database 106, and any other computing hardware and software of the computing network. For example, the monitored performance may include utilization of storage capacity (e.g., hard drive), CPU usage by each process, order per minute (OPM) being purchased, the quantity of each product that is ordered, the quantity of each product that is saved by customers for later purchase, the quantity of each product that is searched or hit by customer, how many customers visit the e-commerce website in a period of time, e.g., one week, two weeks, or one month, at which time of day visits to the e-commerce website by customers peaks, etc. The data related to the monitored performance may be stored in the database device 106. The dashboard 108 may be hosted on various platform as described above. In addition, the dashboard 108 may be hosted on a cloud platform.

The device 110 may be any computing device, such as a mobile phone, a computing tablet, or a laptop computer, which may be used by the user to access the dashboard 108. The user who uses the device 110 may be authorized to access the dashboard 108. The user may be required to provide some inputs (e.g., parameters or requirements) to access the dashboard 108. For example, the input may specify what type performance of the computer network system the user desires to access. The parameters may specify, for example, a time period range during which the specified performance is monitored. The requirements may specify a threshold for the specified performance, for example, the user may want to access the performance of processes that have a CPU usage greater than 50%.

The system and method disclosed herein may automatically log the user in to access the dashboard, and navigate to the sites related to the desired information. The system and method may be configured to automatically scroll webpages on the site monitoring the specified performance of the computer network, based on the specified requirements. The system and method may be configured to automatically adjust zoom of the webpages if required to capture the screenshots when triggered. For example, a screenshot of the webpage may be taken normally. The screenshot of the webpage may be taken with zoom factor 40% and scroll.

The captured screenshots may be saved as image files on the image data repository 112. The image data repository 112 may be a local storage device, a computing storage server, or a cloud storage device. The image files may be saved in any suitable format, for example, PNG format, GIF format, TIFF format, JPEG format, etc. The name convention for the image files may be, for example, in a format: Page-Name_Date-Time_Sequence. Additionally, the system and method disclosed herein may further automatically create a ZIP file to store all the image files on the image data repository 112. All the detail logs associated with the image files may further be automatically stored on the image data repository 112 for further detailed analysis.

Messaging server 114 may be integrated into the disclosed system and method. The messaging server 114 may be a SMTP server, a slack server, or any other suitable messaging server. The image files stored on the image data repository 112 and the detail logs associated with the image files may be sent to the designated recipients via specified channels of the messaging server 114. The image files and the associated detail logs may be selectively passed on to the designated recipients, based on predetermined criteria. For example, only image files related to customer order status may be sent to the designated recipients.

The designated recipients may be specified. For example, a specific group of emails may be specified for receiving the image files. The specified channel for transmitting the image files may be specified. For example, an email or required slack channel name may be designated.

The image files and the associated detailed logs received by the designated recipients may be further analyzed for assessing the performance of hardware and software. For example, some applications may run slower than expected; some processes may consume more CPU power; and some services may reach the maximum handing capacity. Based on the analysis, the identified errors may be identified and corrected; the low performance may be boosted; and computing resources and load may be balanced. Thus, the performance of the computer network system may be significantly improved.

The communications network 118 may be any wired and/or wireless communication networks, such as WIFI, Bluetooth, near field communications, Internet, etc. The communications among the servers and the devices, may be encrypted and authenticated.

The system 100 may further be configured to send out alerts when the performance of the computer network does not meet a pre-determined threshold. For example, when the hit number per minute of the e-commerce website reaches an upper limit number (e.g. 20,000). Further, such alerts may trigger actions to automatically handle the activities associated with the alert. For example, a process may be terminated when the CPU usage by this process reaches more than 80% of CPU power, to provide more CPU power to other processes. Also, more computing power and resources may be automatically provided to accommodate the increasing hit number per minute, such that the e-commerce website may not slow down or crash.

Figure 2:
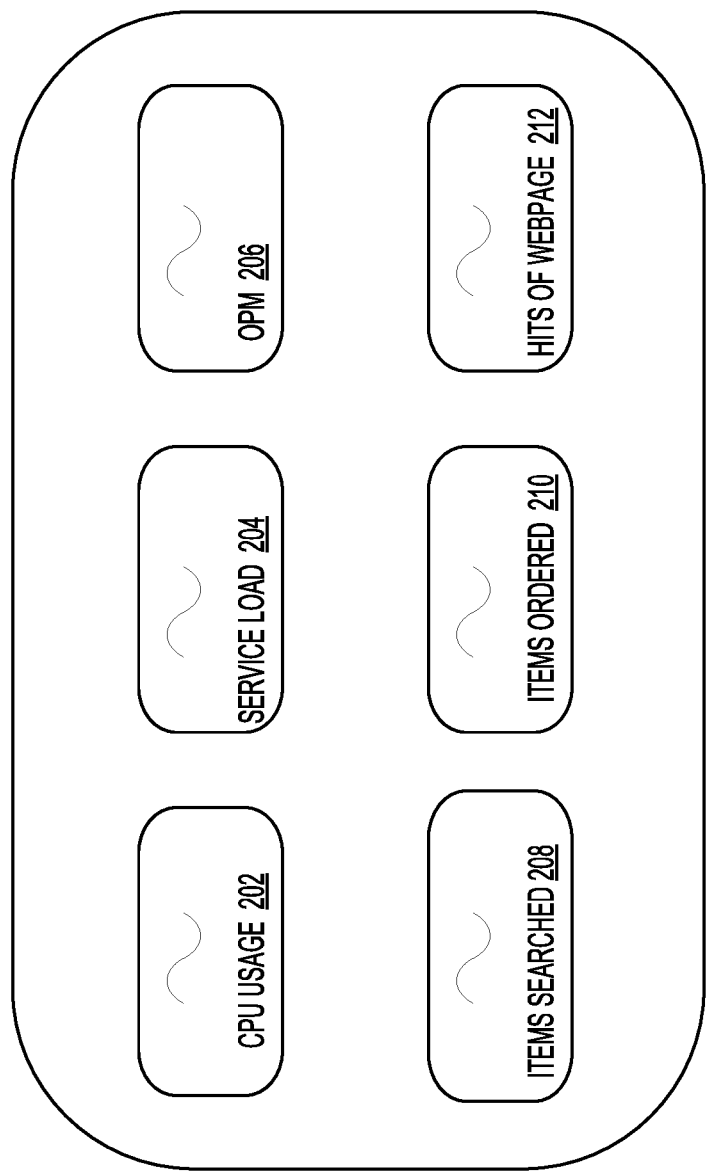
FIG. 2 illustrates an exemplary dashboard in accordance with one embodiment.
Figure 2:
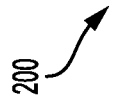

FIG. 2 illustrates an exemplary dashboard 200 in accordance with one embodiment. The dashboard 200 may include monitoring CPU usage 202 of each application, service load 204, OPM 206, item searched 208, items ordered 210, and hits on webpage 212.

The CPU usage 202 may display variations of CPU usage for each application at certain time points, for example, every half hour. By automatically capturing the screenshots of this CPU usage, performance metrics and errors related to CPU usage may be evaluated and detected. Further, action to correct the detected errors may be automatically performed.

Service load 204 may display variations of workload of each service with time. For example, memory consumed by a service during a certain period of time may be captured automatically. By analyzing such captured images, peak memory consumption by the service may be identified, and an action to rebalance the workload of the service may be performed.

OPM 206 may demonstrate variations of orders per minute. By automatically capturing screenshots of OPM 206, low OPM and peak OPM may be identified to better distribute workload of the computer network system, making the system more efficient and able to perform more tasks.

Similarly, item searched 208, items ordered 210, and hits on webpage 212 may demonstrate variations with time of items searched by customers, items ordered by customers, and hits of webpage by customers, respectively. By automatically capturing and analyzing screenshots, errors and low performance may be detected and corrected automatically.

Figure 3:
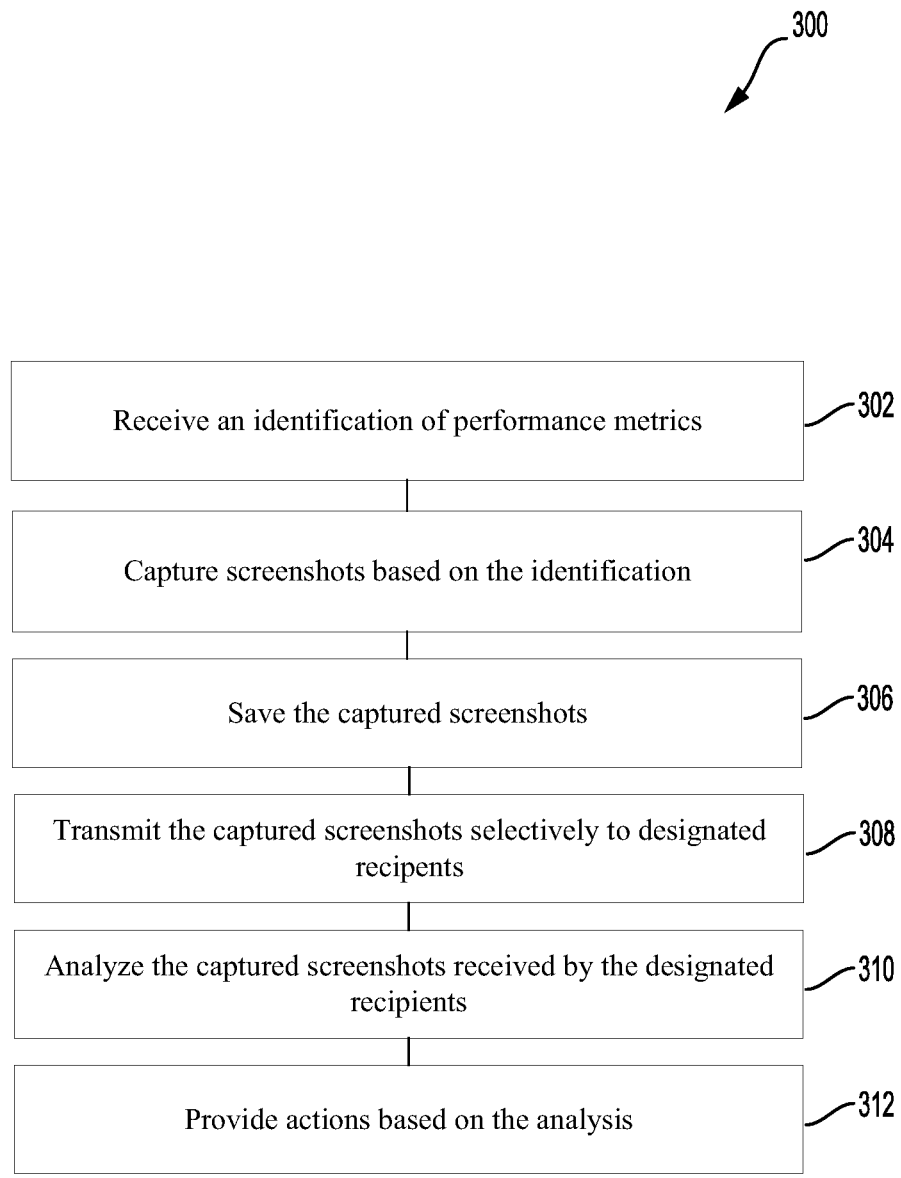
FIG. 3 illustrates an exemplary method of improving computer network system, in accordance with one embodiment.

FIG. 3 shows an exemplary method 300. The method 300 may be implemented in the above disclosed systems, and may include the following steps. Some details may be found by referring to the above description of the systems 100 and 200.

At step 302, the system may receive an identification of performance metrics of the computer network system to be monitored. The identification may include specifying desired performance metrics (e.g., OPM, CPU usages, memory consumption, etc.) specifying a time range for the desired performance metrics during which the performance metrics is monitored (e.g., one day, one week, or one month), specifying desired features of the desired performance metrics (e.g., average values, maximum values, minimum values), etc. The identification may be entered via a web browser in GUI mode. Credentials for accessing the dashboards may also be received.

At step 304, the desired performance metrics of the computer system may be monitored, and screenshots of the desired performance metrics may be captured automatically, based on the identification. Based on the identification, webpages on which dashboards are hosted for the desired performance may be automatically navigated through. Relevant screenshots of the webpages may be captured automatically. The method 300 may further automatically scroll, adjust zoom and auto login to the webpages and various services with the provided credentials.

At step 306, the screenshots may be saved locally, to a server, or on a cloud storage computing facility. The captured screenshots may be saved in any image file format, such as PNG, GIF, TIFF, JPEG, etc. Those screenshots image files may be further automatically compressed and grouped into one compressed image file, such as a ZIP file.

At step 308, the screenshots may be selectively transmitted to designated recipients. At this step, the user may be asked to specify recipients, such as individual employees, a group of employees, or a specific team. The designated recipients may also have been previously specified in the identification. The transmission of the screenshots may be performed via emails or other messaging application (e.g., slack). The user may have an option to select either emails or slack channel names. All the captured screenshots may be transmitted to the designated recipients, for example, in one ZIP file as attachment along with custom messages. The captured screenshots may be selectively transmitted to the designated recipients, such as memory consumption related screenshots, OPM related screenshots, or other performance metrics. The selection of screenshots may be either based on the user input or determined by the user when this step is performed.

At step 310, the screenshots received by the designated recipients may be analyzed. The specific performance metrics may be assessed, and undesirable performance may be identified. For example, an application may consume more computing resources than expected. Also peak values of performance metrics may also be identified, for example, OPM may peak during holiday season.

At step 312, actions may automatically be provided based on the analysis. Configurations of the computer network may be changed to address, for example, the identified undesirable performance metrics. For example, a service consuming more than expected computing resources may be terminated, or workload of the computer network system may be rebalanced. Further, for example, OPM peak may be used to predict OPM for next holiday season, so that the computer network system of e-commerce may be adapted to provide sufficient handling capacity for such high OPM.

In some embodiments, the method 300 may further comprise triggering an alert when a value of a performance metrics crosses or is outside of a threshold. For example, an alert may be triggered when the value of OPM is greater than a specified threshold (e.g., 20,000). In such way, the computer network system can be adjusted to address the alert, to improve robustness of the computer network system.

In some embodiments, the method 300 may further comprise capturing screenshots of the dashboards on demand, for example, based on external trigger. For example, the external trigger may be a timing (e.g., 1:00 AM each Monday). Based on the external trigger, the method 300 may run the pre-configured tasks. The pre-configured tasks may include capturing screenshots of the dashboard for a specified performance metrics, sending out the captured screenshots to designated recipients, etc.

Figure 4:
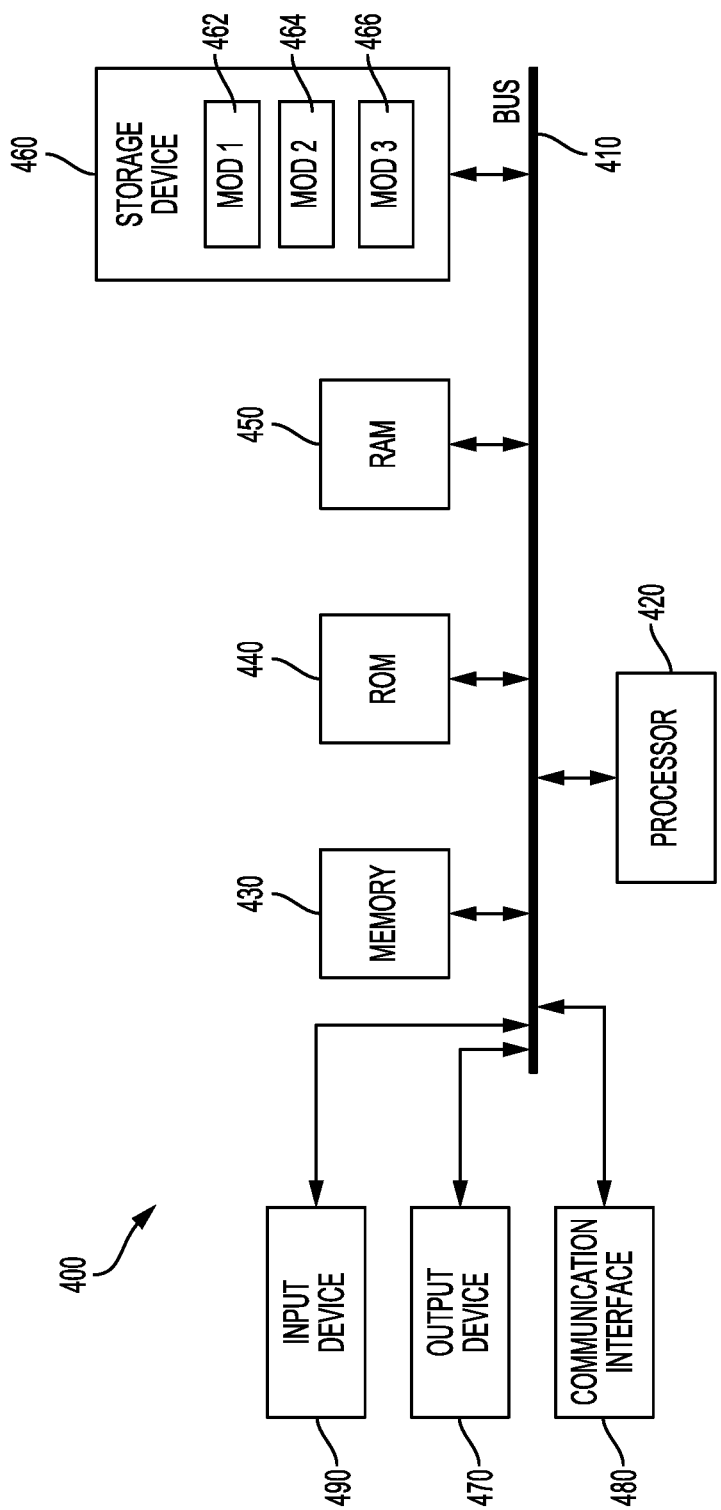
FIG. 4 illustrates an exemplary computer system that may implement a portion of the system in FIG. 1 and the method in FIG. 3.

With reference to FIG. 4, an exemplary system 400 is shown that may implement a portion of the systems 100 and 200 and/or the method 300. The system 400 can include a processing unit (CPU or processor) 420 and a system bus 410 that couples various system components including the system memory 430 such as read only memory (ROM) 440 and random access memory (RAM) 450 to the processor 420. The system 400 can include a cache of high speed memory connected directly with, in close proximity to, or integrated as part of the processor 420. The system 400 copies data from the memory 430 and/or the storage device 460 to the cache for quick access by the processor 420. In this way, the cache provides a performance boost that avoids processor 420 delays while waiting for data. These and other modules can control or be configured to control the processor 420 to perform various actions. Other system memory 430 may be available for use as well. The memory 430 can include multiple different types of memory with different performance characteristics. It can be appreciated that the disclosure may operate on a computing device 400 with more than one processor 420 or on a group or cluster of computing devices networked together to provide greater processing capability. The processor 420 can include any general purpose processor and a hardware module or software module, such as module 1 462, module 2 464, and module 4 366 stored in storage device 460, configured to control the processor 420 as well as a special-purpose processor where software instructions are incorporated into the actual processor design. The processor 420 may essentially be a completely self-contained computing system, containing multiple cores or processors, a bus, memory controller, cache, etc. A multi-core processor may be symmetric or asymmetric.

The system bus 410 may be any of several types of bus structures including a memory bus or memory controller, a peripheral bus, and a local bus using any of a variety of bus architectures. A basic input/output (BIOS) stored in ROM 440 or the like, may provide the basic routine that helps to transfer information between elements within the computing device 400, such as during start-up. The computing device 400 further includes storage devices 460 such as a hard disk drive, a magnetic disk drive, an optical disk drive, tape drive or the like. The storage device 460 can include software modules 462, 464, 466 for controlling the processor 420. Other hardware or software modules are contemplated. The storage device 460 is connected to the system bus 410 by a drive interface. The drives and the associated computer-readable storage media provide nonvolatile storage of computer-readable instructions, data structures, program modules and other data for the computing device 400. In one aspect, a hardware module that performs a particular function includes the software component stored in a tangible computer-readable storage medium in connection with the necessary hardware components, such as the processor 420, bus 410, display 470, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 400 is a small, handheld computing device, a desktop computer, or a computer server.

Although the exemplary embodiment described herein employs the hard disk 460, other types of computer-readable media which can store data that are accessible by a computer, such as magnetic cassettes, flash memory cards, digital versatile disks, cartridges, random access memories (RAMs) 450, and read only memory (ROM) 440, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 400, an input device 490 represents any number of input mechanisms, such as a microphone for speech, a touch-sensitive screen for gesture or graphical input, keyboard, mouse, motion input, speech and so forth. An output device 470 can also be one or more of a number of output mechanisms known to those of skill in the art. In some instances, multimodal systems enable a user to provide multiple types of input to communicate with the computing device 400. The communications interface 480 generally governs and manages the user input and system output. There is no restriction on operating on any particular hardware arrangement and therefore the basic features here may easily be substituted for improved hardware or firmware arrangements as they are developed.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

I claim:

1. A method of improving a computer network, comprising:
   receiving an identification of (i) multiple performance metrics of to be monitored, (ii) a time range for the multiple performance metrics during which the multiple performance metrics is are monitored, and (iii) one or more features of the multiple performance metrics;
   for each performance metric of the multiple performance metrics:
      obtaining dashboard information from a dashboard monitoring the performance metric, the dashboard monitors the performance metric based on the identification;
      determining one or more instances the performance metric crosses a corresponding performance metric threshold based on the dashboard information;
      for each determined instance of the one or more instances, automatically capturing a screenshot of the dashboard monitoring the performance metric of that instance;
      storing automatically the each captured screenshot in an image file format on a storage facility;
   receiving an input phrase which designates recipients;
   identifying each captured screenshot that matches the input phrase;
   transmitting automatically, via a messaging channel, the each captured screenshot matched with the input phrase to the designated recipients;
   analyzing the received screenshots to assess the desired performance metrics, the analyzing including identifying undesirable performance metrics
   based on the analysis, automatically implementing, by the computer network, one or more operations to change configurations of the computer network to address the identified undesirable performance metrics and compressing the captured screenshots into a ZIP file.

2. The method of claim 1, wherein the messaging channel is a slack channel or email.

3. The method of claim 1, wherein the selectivity of the captured screenshots is based on an option entered by the user.

4. The method of claim 1, wherein the identification further includes credentials for accessing dashboards of the multiple performance metrics.

5. The method of claim 1, further comprising automatically issuing an alert when a value of the performance metric is outside of the corresponding performance metric threshold.

6. The method of claim 1, further comprising automatically scrolling a webpage on which a plurality of dashboards are hosted to capture the screenshots, the plurality of dashboards including the dashboard monitoring the performance metric.

7. The method of claim 1, further comprising automatically adjust zoom of a webpage on which the a plurality of dashboards are hosted to capture the screenshots, the plurality of dashboards including the dashboard monitoring the performance metric.

8. The method of claim 1, further comprising automatically logging into a webpage on which a plurality of dashboards are hosted to capture the screenshots, the plurality of dashboards including the dashboard monitoring the performance metric.

9. A system for improving computer network, comprising a processor, and a computer-readable storage medium having instructions stored which, when executed by the processor, cause the processor to perform operations comprising:
   receiving an identification of (i) multiple performance metrics of to be monitored, (ii) a time range for the multiple performance metrics during which the multiple performance metrics is are monitored, and (iii) one or more features of the multiple performance metrics;
   for each performance metric of the multiple performance metrics:
      obtaining dashboard information from a dashboard monitoring the performance metric, the dashboard monitors the performance metric based on the identification;
      determining one or more instances the performance metric crosses a corresponding user defined performance metric threshold based on the dashboard information;
      for each determined instance of the one or more instances, automatically capturing a screenshot of the dashboard monitoring the performance metric of that instance;
      storing automatically the each captured screenshot in an image file format on a storage facility;
   receiving an input phrase which designates recipients;
   identifying each captured screenshot that matches the input phrase;
   transmitting automatically, via a messaging channel, the each captured screenshot matched with the input phrase to the designated recipients;
   analyzing the received screenshots to assess the desired performance metrics, the analyzing including identifying undesirable performance metrics
   based on the analysis, automatically implementing, by the computer network, one or more operations to change configurations of the computer network to address the identified undesirable performance metrics; and compressing the captured screenshots into a ZIP file.

10. The system of claim 9, wherein the messaging channel is a slack channel or email.

11. The system of claim 9, wherein the selectivity of the captured screenshots is based on an option entered by the user.

12. The system of claim 9, wherein the identification further includes credentials for accessing dashboards of the multiple performance metrics.

13. The system of claim 9, further comprising instructions stored which, when executed by the processor, cause the processor to perform operations comprising:

automatically issuing an alert to the user when a value of the performance metric is outside of the corresponding performance metric threshold.

14. The system of claim 9, further comprising instructions stored which, when executed by the processor, cause the processor to perform operations comprising:

automatically scrolling a webpage on which a plurality of dashboards is are hosted to capture the screenshots, the plurality of dashboards including the dashboard monitoring the performance metric.

15. The system of claim 9, further comprising instructions stored which, when executed by the processor, cause the processor to perform operations comprising:

automatically adjust zoom of a webpage on which a plurality of dashboards are hosted to capture the screenshots, the plurality of dashboards including the dashboard monitoring the performance metric.

16. The system of claim 9, further comprising instructions stored which, when executed by the processor, cause the processor to perform operations comprising:

automatically logging into a webpage on which a plurality of dashboards are hosted to capture the screenshots, the plurality of dashboards including the dashboard monitoring the performance metric.

17. The system of claim 9, wherein the input phrase is CPU.

18. The system of claim 9, wherein the input phrase is a team name.

* * * * *